United States Patent
Squire et al.

(10) Patent No.: US 9,021,857 B1
(45) Date of Patent: May 5, 2015

(54) COVERS WITH A MULTIPLICITY OF SENSORS FOR TRAINING MANNEQUINS, PUNCHING BAGS OR KICKING BAGS

(75) Inventors: James Conrad Squire, Buena Vista, VA (US); Elizabeth White Baker, Richmond, VA (US); Huston David Clements, Lexington, NC (US)

(73) Assignee: Matts, LLC, Richmond, VA (US)

( * ) Notice: Subject to any disclaimer, the term of this patent is extended or adjusted under 35 U.S.C. 154(b) by 380 days.

(21) Appl. No.: 13/434,180

(22) Filed: Mar. 29, 2012

Related U.S. Application Data

(60) Provisional application No. 61/471,867, filed on Apr. 5, 2011, provisional application No. 61/501,486, filed on Jun. 27, 2011.

(51) Int. Cl.
*G01M 7/00* (2006.01)
*A41H 1/00* (2006.01)
*G01L 5/00* (2006.01)
*G01L 3/00* (2006.01)

(52) U.S. Cl.
CPC ... *A41H 1/00* (2013.01); *G01L 3/00* (2013.01); *G01L 5/0052* (2013.01)

(58) Field of Classification Search
CPC .............................. G09B 23/00; G01L 5/0052
USPC .............................................. 73/12.01, 12.04
See application file for complete search history.

(56) References Cited

U.S. PATENT DOCUMENTS

| | | | |
|---|---|---|---|
| 3,818,756 A * | 6/1974 | Barron et al. ................... | 73/172 |
| 3,927,879 A | 12/1975 | Long et al. ....................... | 272/76 |
| 4,004,799 A | 1/1977 | Kundert ........................... | 272/8 |
| 4,077,624 A | 3/1978 | Feaser .............................. | 272/76 |
| 4,088,315 A | 5/1978 | Schemmel ....................... | 272/76 |
| D269,882 S | 7/1983 | Leverton ........................ | D19/59 |
| 4,635,929 A | 1/1987 | Shustack ......................... | 272/76 |
| 4,721,302 A | 1/1988 | Murphy .......................... | 272/78 |
| 4,730,625 A * | 3/1988 | Fraser et al. ................... | 600/594 |
| 4,974,833 A | 12/1990 | Hartman et al. ................ | 272/76 |
| 4,991,231 A | 2/1991 | Swift ................................ | 2/18 |
| 5,281,191 A | 1/1994 | DeSousa ......................... | 482/83 |
| 5,308,084 A * | 5/1994 | Morrell ........................... | 273/403 |
| D384,378 S * | 9/1997 | Sigler ........................... | D21/787 |
| 5,716,302 A | 2/1998 | Andersson ...................... | 482/84 |
| 5,971,398 A | 10/1999 | Broussard et al. ............. | 273/408 |
| 6,349,201 B1 * | 2/2002 | Ford ........................... | 455/404.1 |

(Continued)

FOREIGN PATENT DOCUMENTS

CN 201333295 Y * 10/2009
GB 2249003 A * 4/1992

(Continued)

OTHER PUBLICATIONS

Delayed bilateral internal carotid artery thrombosis following accidental strangulation; Kiani and Simes; British Journal of Anesthesia; 2000.

(Continued)

*Primary Examiner* — Max Noori

(74) *Attorney, Agent, or Firm* — MacCord Mason PLLC

(57) ABSTRACT

A training mannequin has a multiplicity of sensors mounted in a removable covering to measure the efficacy of a specific attack in a localized region, and informs the user of the effects of that attack in terms of the physiological damage it would cause if the attack were inflicted on a typical human.

22 Claims, 5 Drawing Sheets

(56) References Cited

U.S. PATENT DOCUMENTS

| | | | |
|---|---|---|---|
| 6,508,747 B1 * | 1/2003 | Cook | 482/83 |
| 6,769,286 B2 | 8/2004 | Biermann et al. | 73/12.01 |
| 6,928,960 B2 * | 8/2005 | Carlos et al. | 119/853 |
| 7,174,774 B2 * | 2/2007 | Pawar et al. | 73/73 |
| 7,278,957 B2 * | 10/2007 | Ghim | 482/83 |
| 7,526,389 B2 * | 4/2009 | Greenwald et al. | 702/55 |
| 7,909,749 B2 * | 3/2011 | Sheedy | 482/148 |
| 8,011,222 B2 * | 9/2011 | Wiber | 73/12.09 |
| 8,221,291 B1 * | 7/2012 | Kantarevic | 482/8 |
| 8,398,451 B2 * | 3/2013 | Wolfe et al. | 446/175 |
| 2003/0216228 A1 | 11/2003 | Rast | 482/84 |
| 2006/0078870 A1 * | 4/2006 | Yu et al. | 434/396 |
| 2008/0258921 A1 * | 10/2008 | Woo et al. | 340/573.1 |
| 2009/0082179 A1 * | 3/2009 | Le | 482/88 |
| 2009/0257316 A1 | 10/2009 | Squire et al. | 367/137 |
| 2010/0130333 A1 * | 5/2010 | Strong et al. | 482/83 |
| 2011/0015040 A1 | 1/2011 | Fleitz | 482/8 |
| 2011/0159939 A1 * | 6/2011 | Lin et al. | 463/8 |
| 2011/0251802 A1 * | 10/2011 | Song | 702/41 |
| 2012/0210498 A1 * | 8/2012 | Mack | 2/414 |
| 2012/0270197 A1 * | 10/2012 | Brost et al. | 434/267 |
| 2012/0279311 A1 * | 11/2012 | Helmer et al. | 73/768 |

FOREIGN PATENT DOCUMENTS

| | | | |
|---|---|---|---|
| WO | WO 2007011145 A1 * | 1/2007 | |
| WO | WO 2008129248 A1 * | 10/2008 | |

OTHER PUBLICATIONS

The Knockout Guide, MFUZ.com Sep. 20, 2007.
Brute Force: Humans Can Sure Take a Punch; information retrieved from the interned; copyright 2011.
robotshop.com; USB Host Arduino Shield, information retrieved from the internet Mar. 18, 2011.
Pololu.com; Wall Power Adapter; 9VDC, 1A, 5.5x21mm Barrel Jack, Center—Positive; retrieved from the internet Mar. 18, 2011.
robotshop.com; MP3 Arduino Shield copyright 2003-2011.

* cited by examiner

COVERS WITH A MULTIPLICITY OF SENSORS FOR TRAINING MANNEQUINS, PUNCHING BAGS OR KICKING BAGS

This application claims the benefit of the filing dates of provisional applications 61/471,867, filed Apr. 5, 2011 and 61/501,486, filed Jun. 27, 2011.

BACKGROUND OF THE INVENTION

There exists a need among law enforcement, military, and martial arts studios to train their members in techniques too debilitating or dangerous to practice against human training partners, such as kicks designed to break ribs or joint-breaking manipulations. A variety of martial-arts training tools to support these needs are well-known, and may broadly be categorized as either being or not being predominantly anatomically-featured, and as delivering or not delivering feedback to the user on the effectiveness of the technique being practiced.

SUMMARY OF THE INVENTION

The present invention fulfills one or more of these needs in the art by providing an apparatus for enabling the measurement of physical blows to a mannequin representing a human body. The apparatus includes a removable cover for the mannequin, and the cover has a plurality of force sensors located at locations on the cover so that when the cover is placed on the mannequin, the force sensors align with a location on the body known to be vulnerable to physical blows.

Preferably, the force sensors are electrical and output an electrical signal indicative of the force applied to the force sensor. Typically, the force sensors have data cables that deliver data indicative of the force applied to the force sensor to a remote data-gathering electronics package.

The cover has an inside and an outside and the sensors are preferably mounted on the inside of the cover. Preferably, the cables also are affixed to the inside of the cover, so that the cover can be mounted to or removed from the mannequin with minimal entanglement of the cables with the mannequin.

The remote data-gathering electronics package may include an audio output device to provide one of several pre-stored audible signals, selected from the several pre-stored audible signals by a determination of an applied force. The remote data-gathering electronics package may be operatively connected to a plurality of the sensors and is responsive to an incoming signal of an applied force on one of the sensors to monitor all sensors and to determine which sensor receives the comparatively largest force and makes a bodily damage assessment based upon the largest force sensed.

Preferably, an accelerometer is affixed to a portion of the cover that covers the head of the mannequin and that outputs data corresponding to an angular acceleration of the head.

The invention can also be considered as a method of determining a force applied to a mannequin to ascertain if the force is sufficient to cause damage to a human at one of a group of vulnerable portions of the human body. The method includes applying a cover to a mannequin and thereby placing sensors on the cover adjacent the vulnerable portions of the body, connecting connectors from the sensors to a data-gathering electronics package, striking the cover on the mannequin while targeting one of the vulnerable portions, measuring the force applied to the sensors on the cover, and indicating the measured force.

Indicating a measurement may include indicating if the force was sufficient so that it would inflict body damage if applied to a typical human. Indicating a measurement of the measured force may include emitting an audible signal.

Measuring the force applied to the sensors on the cover may include monitoring the force on all of the sensors and selecting the force on a sensor with the greatest applied force for comparison with a threshold.

The invention can also be considered as an instrumented system designed to improve fighting skills including a covering that can be secured over a mannequin modeling the likeness of at least the upper portion of the human body. The covering includes a multiplicity of sensors that measure location-specific applied force, pressure, angular velocity, lateral acceleration, torque, and/or angular acceleration caused by a strike or grappling hold by the user. Electrical apparatus receives electrical signals corresponding to strikes on the sensors to evaluate the force of strikes on the mannequin and informs the user of the sensors' measurements.

The system can provide user feedback by immediate auditory feedback, either quantitative (announcement of numeric values) or qualitative (sound, such as a crack, indicating damage result). The audio feedback device can be mounted on the covering. The audio feedback device may be mounted externally to the covering and coupled by wireless or wired signal transmission.

In some embodiments the damage assessment report is communicated in terms of the physiological damage it would cause.

The system can provide user feedback by numeric or graphical report on an external data reading device such as a personal computer or smart phone. The data may be displayed immediately or may be saved on the training mannequin for later download.

In some embodiments the mannequin has re-breakable joints or bones to provide tactile feedback to the user.

The cover in which the sensors are mounted may be removable from the mannequin.

The invention can also be considered as an apparatus for enabling the measurement of physical blows to a punching bag. A removable cover for the punching bag is configured to wrap around the punching bag and be retained around the punching bag as it receives physical blows. The cover has an image of a person that is visible when the cover is wrapped around the punching bag, and a plurality of force sensors located at locations on the cover correspond to locations on the image of the person known to be vulnerable to physical blows. When the cover is placed on the punching bag, the force sensors can form targets for physical blows with the sensors indicating successful blows on target.

The invention can also be considered as an apparatus for enabling the measurement of physical blows to a kicking bag. A removable cover for the kicking bag is configured to mount on the kicking bag and be retained on the kicking bag as it receives physical blows. The cover has an image of a person that is visible when the cover is mounted on the kicking bag, and a plurality of force sensors located at locations on the cover correspond to locations on the image of the person known to be vulnerable to physical blows. When the cover is placed on the kicking bag, the force sensors can form targets for physical blows with the sensors indicating successful blows on target.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
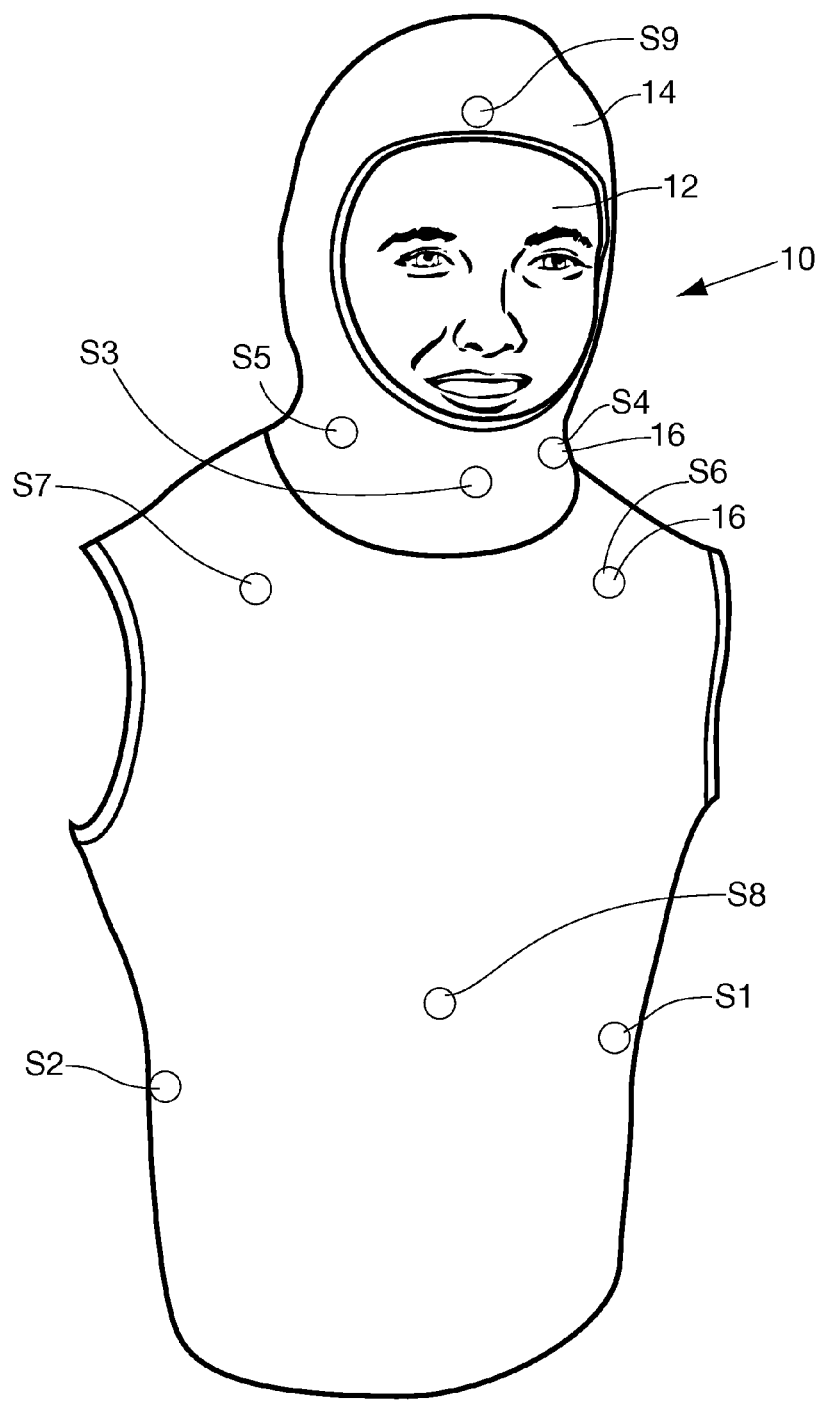
FIG. 1 is a schematic view of an upper torso of a mannequin covered with a neoprene wetsuit vest with hood, according to an embodiment of the invention.

FIG. 1 shows an embodiment 10 of the invention in schematic form. In this embodiment, the upper torso of a person is replicated in a mannequin 12. Mannequins of this type are known to those of ordinary skill in the art, such as "Bob" by Century Martial Arts, whose website is "http://www.century-martialarts.com/Boxing/Training_Bags/BOB_XLR.aspx." Full body mannequins such as the grappling dummy depicted at dummiesunlimited.com/products/martialarts/ and shown in FIG. 2 can also be used. The invention involves a covering 14 for the mannequin or dummy equipped with sensors 16 and data gathering components for the sensors. In the case of a grappling dummy, the cover extends below the waist (or a separate pant-like cover is used) and more sensors are located and calibrated to sense damaging blows at locations covered by the extended cover.

Figure 2:
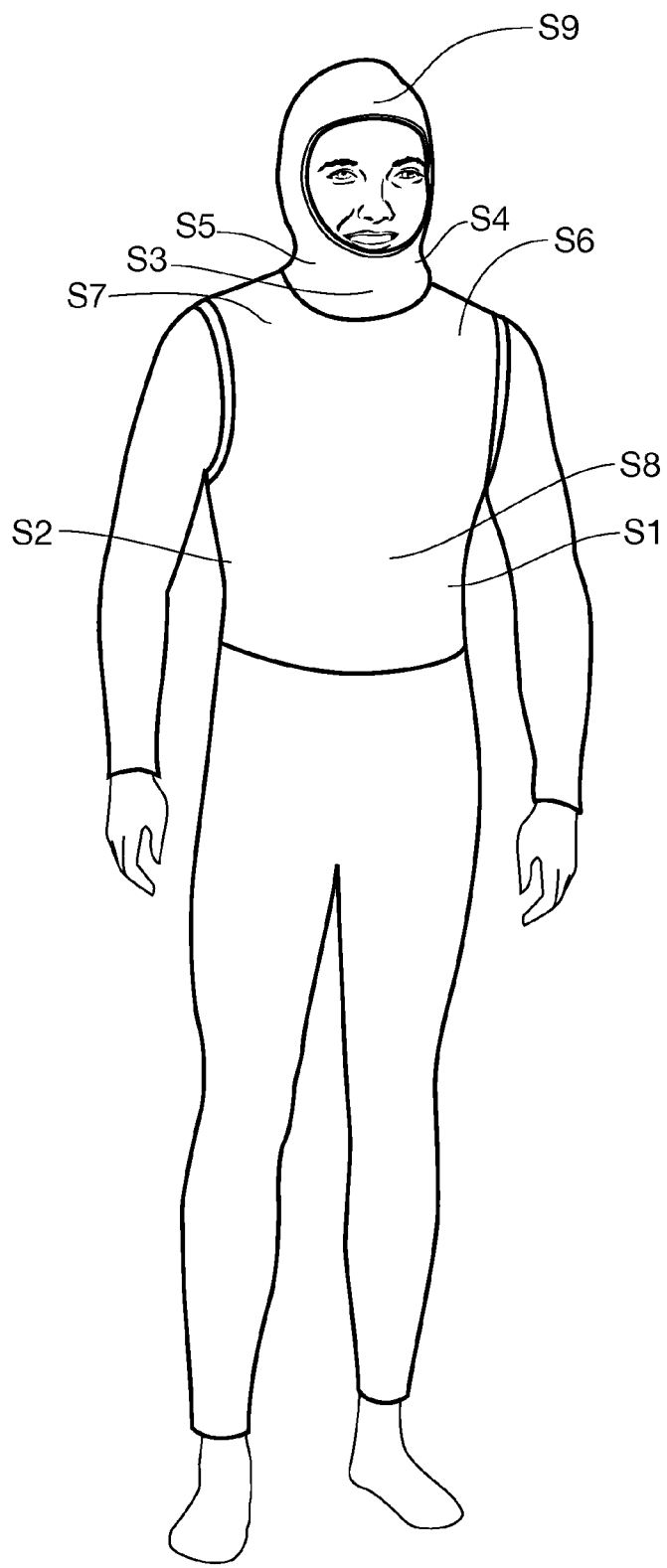
FIG. 2 is a schematic view of a grappling dummy with fitted neoprene wetsuit, according to another embodiment of the invention.

In a preferred embodiment the covering 14 is cloth, such as ⅛" neoprene, also called "L foam" in the textile industry, used for wet suits. Other materials can be used. While the preferred cover is hooded and made of neoprene, other garments and non-garment covers can be used. Preferably, the cover is sized for the mannequin so that it fits closely over the mannequin. This enables the sensors 16 that are attached to the cover to be precisely located over the body location of interest. As seen in FIG. 2, the cover can extend below the waist as far as desired, particularly if injury targets are to be provided lower on the body than those shown in FIG. 1. FIG. 1 shows the suit and the locations of the sensors 16 on the suit, with the sensors sewn to the suit. Alternatively, a hook and loop fastener sewn to the suit mates with a hook and loop fastener on the sensor, so that the sensor can be replaced if damaged by repeated blows from users. Other sensor mounting methods can also be substituted including an adhesive, pins, snaps, and the like. Cables (not shown) from the sensors 16 go to the back of the suit, forming a "spine" of cables that go out from the back of the suit and into the computer or external device with the software (see FIG. 3).

Preferably, the cables are affixed to the inside of the cover so that they stay in position as the cover is put on or removed from the mannequin. The force sensors' locations should be selected precisely enough so that changes in position of the sensor within ½ of the shortest aspect of the striking surface would not be measurable; for a knife hand (a martial arts technique with a short edge), that would be about 1 cm. FIG. 1 also shows preferred sensor placements. These include one (S3) on Adams Apple (to monitor trachea crush), one on each carotid (S4 and S5) (where you take your pulse on side of throat), one on the solar plexus (S8) (two inches caudal of xiphoid process), one on each lower floating rib tip (S2 and S1) (rib XII), and one located generally in the middle of each of the left and right clavicles to monitor clavicle fracture (S6 and S7). The preferred sensor is a carbon-granule embedded force sensor, since it is widely-available, well-understood, flexible, inexpensive, and manufactured in suitable force ranges. The force sensors are flat, so their response naturally lies within 1-2 degrees of normal to the plane of the sensor as it lies flat between the cover 14 and the mannequin 12, which is the desired orientation. An error of 2 deg in orientation gives an error of sin (2 deg)<less than 4%, well under the typical 20% accuracy of the force sensors.

The sensors are preferably selected and located to indicate at least a threshold force indicative of a serious bodily injury. The amount of force required for each of the placements varies, so the sensors selected for each position are preferably selected for a prescribed force threshold, as set forth in the following table:

| Force sensor capabilities | Justification |
| --- | --- |
| The system will calculate the amount of force (up to 4950N) the user delivers a direct hit to either of the 2 floating ribs and compares it to the force needed to fracture a rib (S1 and S2 in FIG. 1) | Research indicates that 3.3 kN is required to fracture an typical rib |
| The system will calculate the amount of force (up to 300N) the user delivers to the trachea and compares it to the force needed to break the trachea. (S3) | Research indicates that 150N will break the trachea. |
| The system will calculate the amount of force (up to 68) the user delivers to the carotid arteries and compares it to the force needed to cause unconsciousness. (S4 and S5) | Research indicates that sudden application of 34N on the carotid arteries will cause a knockout |
| The system will calculate the amount of force (up to 3000N) the user delivers to a clavicle and compares it to the force needed to fracture a clavicle. (S6 and S7) | Research indicates that 1500 will break the clavicle |
| The system will calculate the amount of force (up 90N) that the user delivers to the solar plexus and compares it to the force against the solar plexus that causes the diaphragm to spasm (S8) | Research indicates that 45N to the solar plexus will cause the diaphragm to spasm |

Other thresholds and sensor capacities can be used as desired.

In addition, the preferred embodiment includes an accelerometer/gyroscope (S9) placed to measure the rotational velocity of the head as it turns in the transverse plane ("horizontal") and one to measure rotational velocity of the head in the sagittal plane (ear-to-shoulder direction). This can be done with a single integrated bi-axial gyroscope. Since the accelerometer measures the rotational velocity of the head and since the head rotates as a unit, location is not critical. If using coupled accelerometers, they could be placed near the ears for both transverse and sagittal accelerations. Gyroscopes do not need to be used in a paired array for transverse and a second paired array for sagittal; instead a single transverse and single sagittal gyroscope could be mounted on the back of the head. If the gyroscope sensor is a dual-plane sensor, only a single dual-plane gyroscope mounted at the back of the head is needed, vs. two single-plane gyros, or four single-axis accelerometers. The accelerometer/gyroscope mount can be located within 6 degrees of the transverse and sagittal planes to give a response accurate to within sin (6 deg)~10%.

Using data from S9, the system will calculate the angular acceleration (up to 7900 rads/s$^2$) the user delivers against the head and reference it against the angular acceleration to knock a person unconscious. Research indicates that delivering a blow to the head at 7900 rad/s$^2$ gives an 80% probability of causing a concussion.

Figure 3:
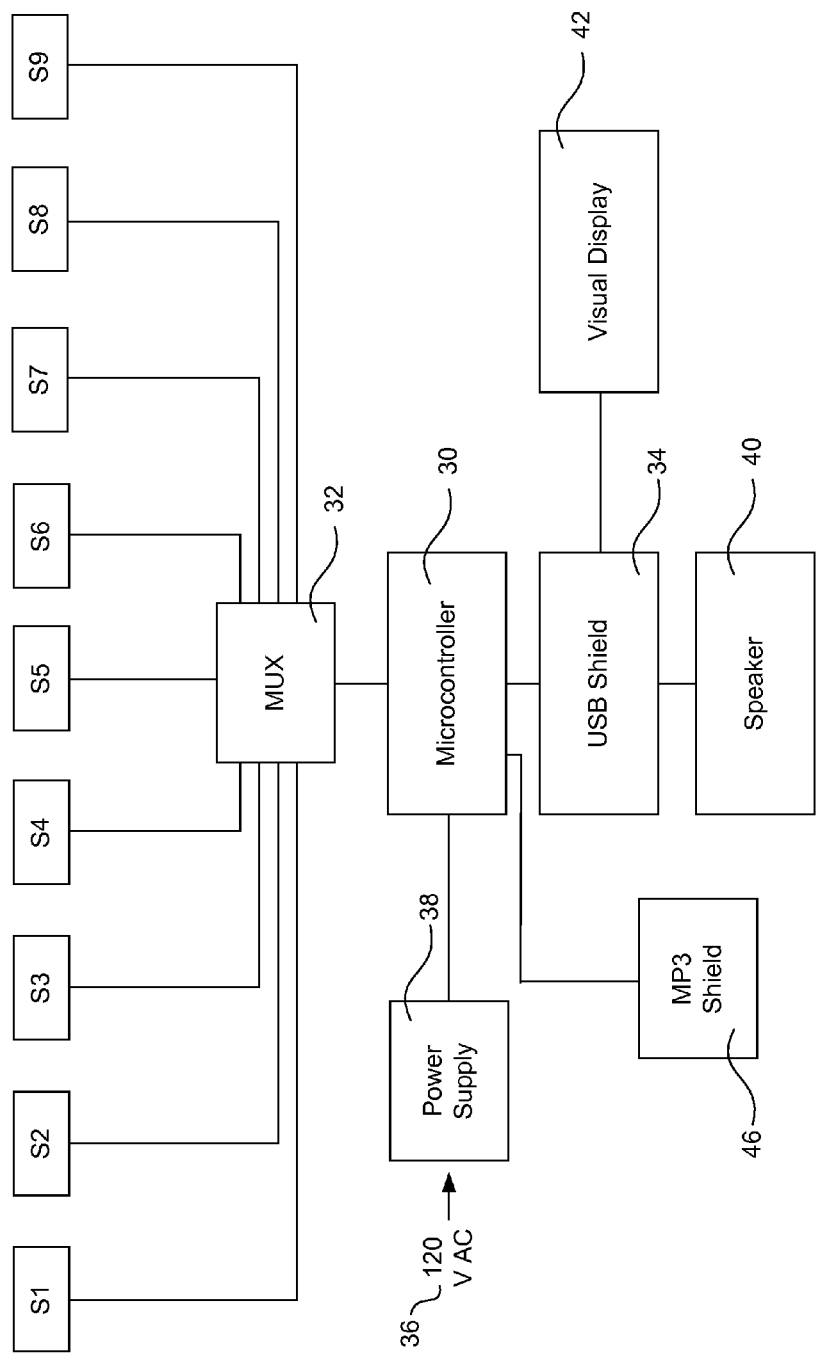
FIG. 3 is a schematic diagram of the wiring for the sensors and data-gathering components.

FIG. 3 shows a schematic diagram of the connections of the sensors to data gathering and logging equipment. In one embodiment an Arduino Mega128 microcontroller 30 can be configured to poll each sensor input every 12 milliseconds. Sensors are voltage scaled, so 0V=no strike, 5V=a 200% of break force strike, the maximum the system is calibrated to monitor. When any input goes above a pre-set threshold (30% of a break) all inputs are monitored for 250 milliseconds. The microcontroller then selects the one with the highest % of break and considers that the primary input with the given maximum reading. This solves the problem of determining which location is struck, since multiple sensors may trigger for a single strike (e.g. a roundhouse to the ribs will cause the head gyro to register, but far less than the rib sensor).

The sensors outputs (S1, S2 . . . S9) are routed through an analog multiplexer 32 to communicate with the microcontroller 30. The microcontroller 30 will interface with an Arduino USB shield 34 and record event data relative to force threshold by only recording the events at which the covered mannequin is struck. In the USB shield a program written in C++ may be used to graph event data. Information retrieved from the USB shield is useful for comparing training regimens. The entire system may run off of 120 V AC 36 connected to a wall power adapter 38 that interfaces with the Arduino microcontroller. Data about the success of a strike can be communicated to the user over a connected speaker 40. The mannequin or electronics can provide a user-audible feedback (exclamatory sounds/words) using pre-recorded sounds/words driven from an MP3 Arduino shield 46 to an external computer speaker. The audible feedback can include screams or insults based upon the striking user's effectiveness. This provides a constant power that supplies the microcontroller 30, sensors, and computer speaker 40. Hardware other than Arduino components can be used, including various microcontroller designs, well within the skill of the art.

The system can provide user feedback by immediate auditory feedback, either quantitative (announcement of numeric values) or qualitative (sound, such as a crack, indicating damage result). The audio feedback device 40 can be mounted on the covering 14. The audio feedback device may be mounted externally to the covering and coupled by wireless or wired signal transmission.

In some embodiments the damage assessment report is communicated in terms of the physiological damage it would cause.

The system can provide user feedback by numeric or graphical report on an external data reading device such as a visual display 42, perhaps on a personal computer or smart phone. The data may be displayed immediately or may be saved on the training mannequin for later download.

In some embodiments the torso has re-breakable joints or bones to provide tactile feedback to the user.

A preferred embodiment yields a sparring mannequin with human-like anatomy that wears a skin tight garment with force/pressure sensors at critical areas: collarbone, ribs, solar plexus, and windpipe, carotid arteries. Realism is accomplished by having a human like face and putting sensors in critical positions.

In addition to the sensor locations enumerated above, those of ordinary skill in the art will recognize other vulnerable all body parts where sensors can be located, such as kidneys, groin, kneecaps. In addition, sensors can be located at locations on a full-body dummy with removable exoskeleton to allow one to grapple with it on the mat and get it into arm bars, leg bars, and other joint manipulations.

A particular advantage of the device is that it is easy to manufacture. In addition, the construction makes parts replaceable and upgradeable. It also simplifies inventory (a vest that weighs a three and a half pounds and has a volume of about one half of a cubic foot vs. fifty pound mannequin that is twelve cubic feet), reduces capital costs (the vest is half the cost of the dummy), and permits changes in configuration (the sensors can be attached in a removable fashion, for instance by hook and loop fasteners). Also, if a sensor is damaged, it is relatively easy to replace.

Figure 4:
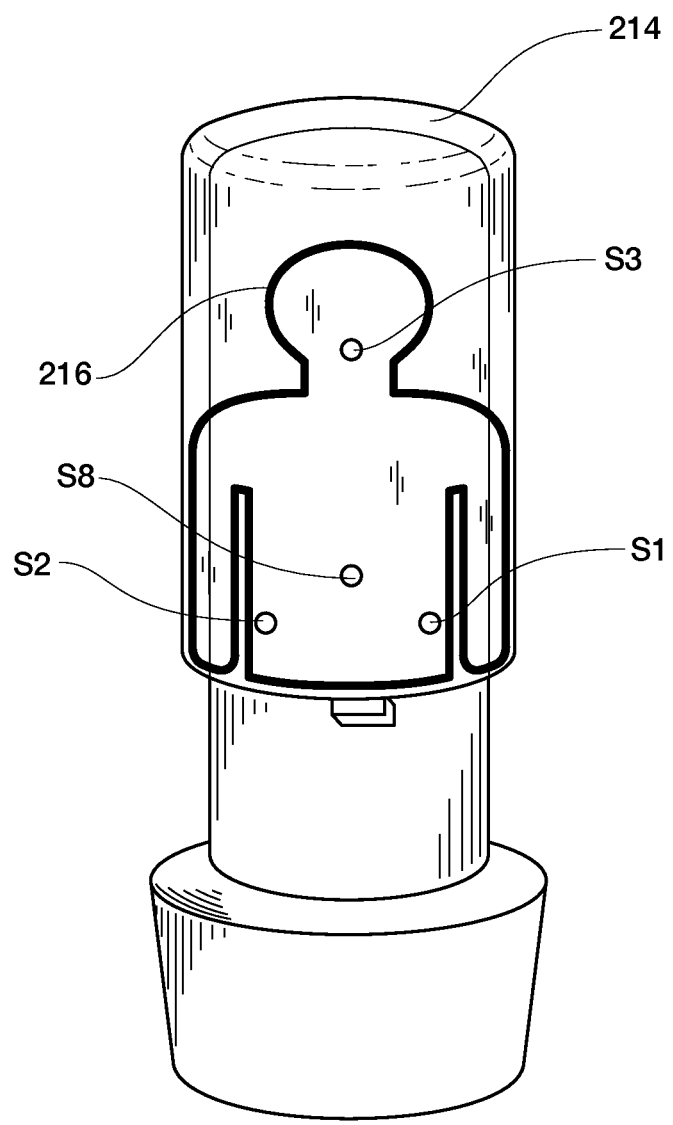
FIG. 4 shows an alternate embodiment of a cover that can be mounted on a kicking bag.
Figure 5:
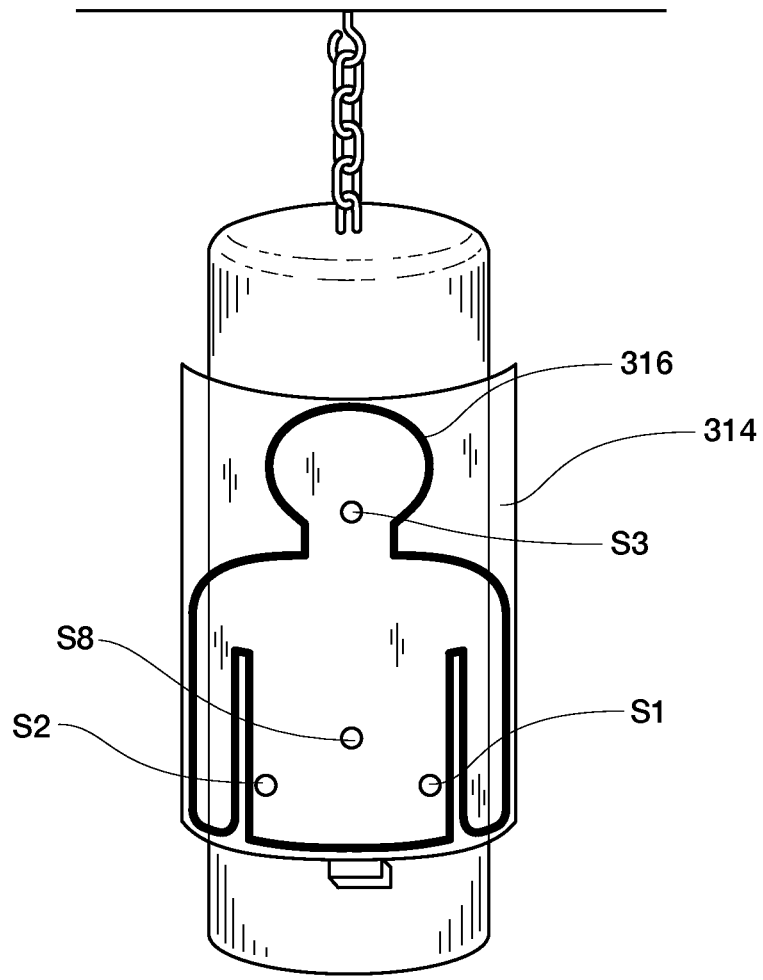
FIG. 5 shows an alternate embodiment of a cover that can be strapped to a vertical bag.

FIG. 4 shows an alternate embodiment of a cover 214 that can be mounted on a kicking bag. This embodiment is configured to form a cap on the kicking bag for easy placement on the top of the bag and easy removal. It can be supplemented with hook and loop or other forms of attachment to hold it in place on the kicking bag during physical blows. FIG. 5 shows an alternate embodiment of a cover 314 that can be strapped to a vertical punching bag. Punching bags usually hang from the ceiling, and kicking bags typically attach on the floor to a weighted base, but other configurations are within the scope of this invention. The cover can be held in place with any suitable device, such as hook-and-loop-style ties in back for a punching bag and/or straps over the top or sides of the bag. Other ways to affix the cover to the bag may be used. Preferably, it can be easily attached/detached from the punching bag. In each of these embodiments, the cover can be made from a flat sheet of vinyl or other flexible material. A simulated person's head, shoulders, and upper torso are outlined on it on it, homicide-victim-chalked-outline style as seen at 216, 316. The torso has sensors S1, S2, S3 and S8 as in the earlier embodiments. Other sensor locations can be used. The electronics can be self-contained in a box attached to the cover, as seen at the bottom of the covers 214, 314. Alternatively, the sensors can be connected by wires or cables to remote electronics as in the previous embodiments. The cover 214 or 314 is mounted to the bag. A thus-equipped punching or kicking bag can monitor punches and provide feedback. Sparring combinations are often taught using vertical bags such as those shown in FIGS. 4 and 5, even though they look nothing like a human. The muscle skills trained from those exercises transfer surprisingly easily when sparring against people. Besides this, muscle memory sparring combination training it could be used for speedwork (increasing fast twitch to slow twitch muscle ratios), as well as to make a game of sparring practice (useful to attract new people to a karate studio or for training younger children).

Another option is to include placement indicators on the covering 14 or the covers 214 and 314 of FIGS. 4 and 5. Such indicators can be light emitting diodes to indicate the locations to be hit. Thus, training exercises may be created by indicating a series of locations to be hit in a programmed pattern, and scores may optionally be computed based upon the time taken to complete the hit pattern.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. An apparatus for enabling the measurement of physical blows or grappling holds to a mannequin representing a human body comprising
    a removable cover for the mannequin,
    the cover having a plurality of force sensors located at locations on the cover so that when the cover is placed on the mannequin, the force sensors aligned with a location on the body known to be vulnerable to physical blows or grappling holds;

wherein data from the force sensors is read by a data-gathering electronics package, the data-gathering electronics package operatively connected to a plurality of the sensors and is responsive to an incoming signal of an applied force on one of the sensors to monitor all sensors and to determine which sensor receives the comparatively largest force and makes a bodily damage assessment based upon the largest force sensed.

2. An apparatus as claimed in claim 1 wherein the force sensors are electrical and output an electrical signal indicative of the force applied to the force sensor.

3. An apparatus as claimed in claim 1 wherein the force sensors have data cables that deliver data indicative of the force applied to the force sensor to a remote data-gathering electronics package.

4. An apparatus as claimed in claim 1 wherein the cover has an inside and an outside and the sensors are mounted on the inside of the cover.

5. An apparatus as claimed in claim 4 wherein the cables are affixed to the inside of the cover, so that the cover can be mounted to or removed from the mannequin with minimal entanglement of the cables with the mannequin.

6. An apparatus as claimed in claim 1 wherein the data-gathering electronics package is remote.

7. An apparatus as claimed in claim 1 wherein the data-gathering electronics package includes an audio output device to provide one of several pre-stored audible signals, selected from the several pre-stored audible signals by a determination of an applied force.

8. An apparatus as claimed in claim 1 further comprising an accelerometer affixed to a portion of the cover that covers a head of the mannequin and that outputs data corresponding to an angular acceleration of the head.

9. An apparatus as claimed in claim 1 wherein the force sensors are electrical and output an electrical signal indicative of whether the force applied to the force sensor is sufficient to cause a physiological injury to a typical human opponent.

10. An apparatus as claimed in claim 1 wherein the data-gathering electronics package is operatively connected to a plurality of the sensors and is responsive to an incoming signal of an applied force on one of the sensors to monitor all sensors and to determine which sensor receives the comparatively largest force and assesses the intended location of a user's strike based upon the largest force sensed.

11. An apparatus as claimed in claim 1 wherein the force sensors are electrical and output an electrical signal indicative of whether the force applied to the force sensor is sufficient to cause a physiological injury to a typical human opponent.

12. An apparatus for enabling the measurement of physical blows to a mannequin representing a human body comprising
a removable cover for the mannequin,
the cover having a plurality of force sensors that each output an electrical signal indicative of the force applied to the force sensor, the sensors being located at locations on an inside of the cover so that when the cover is placed on the mannequin, the force sensors align with a location on the body known to be vulnerable to physical blows,
an accelerometer affixed to a portion of the cover that covers a head of the mannequin and that outputs data corresponding to an angular acceleration of the head,
a remote data-gathering electronics package that is operatively connected to the plurality of the sensors and the accelerometer and is responsive to an incoming signal of an applied force on one of the sensors or accelerometer to monitor all sensors and to determine which sensor receives the comparatively largest force and makes a body damage assessment based upon the largest force sensed and that includes an audio output device to provide one of several audible signals, selected from the several signals by a determination of an applied force, and
data cables from the force sensors to deliver data indicative of the force applied to the force sensor to the remote data-gathering electronics package, the cables being affixed to the inside of the cover, so that the cover can be mounted to or removed from the mannequin with minimal entanglement of the cables with the mannequin.

13. A method of determining a force applied to a mannequin to ascertain if the force is sufficient to incur damage to a human at one of a group of vulnerable portions of the human body comprising
applying a cover to a mannequin and thereby placing sensors on the cover adjacent the vulnerable portions of the body,
connecting connectors from the sensors to a data-gathering electronics package,
striking the cover on the mannequin, targeting one of the vulnerable portions,
measuring the force applied to the sensors on the cover,
determining which sensor receives the comparatively largest force,
making a bodily damage assessment based upon the largest force sensed, and
indicating a measurement of the measured force.

14. A method as claimed in claim 13 wherein indicating a measurement includes indicating if the force was sufficient so that it would inflict body damage if applied to a typical human.

15. A method as claimed in claim 13 wherein measuring the force applied to the sensors on the cover includes monitoring the force on all of the sensors and selecting the force on a sensor with the greatest applied force for comparison with a threshold.

16. A method as claimed in claim 13 wherein indicating a measurement of the measured force includes emitting an audible signal.

17. An apparatus for enabling the measurement of physical blows to a punching bag comprising
a removable cover for a punching bag configured to wrap around a punching bag and be retained around the punching bag as the bag receives physical blows,
an image of a person on the cover that is visible when the cover is wrapped around the punching bag, and
a plurality of force sensors located at locations on the cover corresponding to locations on the image of the person known to be vulnerable to physical blows,
whereby when the cover is placed on the punching bag, the force sensors can form targets for physical blows with the sensors indicating if an applied force is sufficient so that it would inflict body damage if applied to a typical human.

18. An apparatus for enabling the measurement of physical blows to a kicking bag comprising
a removable cover for a kicking bag configured to mount on the kicking bag and be retained on the kicking bag as the bag receives physical blows,
an image of a person on the cover that is visible when the cover is mounted on a kicking bag, and
a plurality of force sensors located at locations on the cover corresponding to locations on the image of the person known to be vulnerable to physical blows,
whereby when the cover is placed on the kicking bag, the force sensors can form targets for physical blows with the sensors indicating if an applied force is sufficient so that it would inflict body damage if applied to a typical human.

19. An apparatus as claimed in claim 11 wherein the physiological injury is a knockout.

20. A method as claimed in claim 13 wherein measuring the force applied to the sensors on the cover includes comparing the force with a threshold, wherein the threshold for the vulnerable portion of the human body is selected from the group consisting of 4950N for the rib, 300N for the trachea, 68N for the carotid arteries, 3000N for the clavicle, 90N for the solar plexus or 7900 rads/$s^2$ for the head, or more than one of them.

21. A method as claimed in claim 15 wherein the vulnerable portion of the human body is selected from the group consisting of the rib, trachea, carotid arteries, clavicle, solar plexus, head, or more than one of them.

22. A method as claimed in claim 15 wherein indicating a measurement of the measured force includes, if the force applied exceeds the threshold, indicating that the force applied exceeds the threshold.

* * * * *